United States Patent [19]

Edahiro et al.

[11] Patent Number: 5,201,382

[45] Date of Patent: Apr. 13, 1993

[54] FOUR-WHEEL-STEERED VEHICLE CONTROL SYSTEM

[75] Inventors: Takeshi Edahiro; Ryuya Akita; Hiroshi Ohmura; Takashi Nakashima; Takeshi Murai, all of Hiroshima, Japan

[73] Assignee: Mazda Motor Corporation, Hiroshima, Japan

[21] Appl. No.: 677,528

[22] Filed: Mar. 29, 1991

[30] Foreign Application Priority Data

Mar. 30, 1990 [JP] Japan ................... 2-83603

[51] Int. Cl.⁵ .................... B62D 7/00; B60K 28/16
[52] U.S. Cl. ....................... 180/197; 180/140; 180/142; 303/92; 364/426.02
[58] Field of Search ............ 180/197, 140, 142; 364/426.02, 426.03; 303/92; 74/866

[56] References Cited

U.S. PATENT DOCUMENTS

| | | | |
|---|---|---|---|
| 4,941,095 | 7/1990 | Imaseki et al. | 180/140 |
| 4,971,174 | 11/1990 | Abe et al. | 303/92 |
| 5,020,619 | 6/1991 | Kanazawa et al. | 180/140 |
| 5,054,568 | 10/1991 | Shiraishi et al. | 180/142 |
| 5,090,510 | 2/1992 | Watanabe et al. | 180/197 |

FOREIGN PATENT DOCUMENTS

| | | |
|---|---|---|
| 0283453 | 9/1988 | European Pat. Off. |
| 443785 | 8/1991 | European Pat. Off. |
| 4101385 | 7/1991 | Fed. Rep. of Germany |
| 59-26365 | 2/1984 | Japan |
| 2100886 | 1/1983 | United Kingdom |

OTHER PUBLICATIONS

Patent Abstracts of Japan; vol. 9, No. 316, Dec. 12, 1985 & JP-A-60 151 160 (Nippon Denso K.K.) Aug. 9, 1985 abstract.

Primary Examiner—Mitchell J. Hill
Attorney, Agent, or Firm—Sixbey, Friedman, Leedom & Ferguson

[57] ABSTRACT

A front drive vehicle is provided with a four-wheel steering system and a traction control system. A control system for the vehicle detects whether a failure occurs in the traction control system, and causes the rear wheel turning mechanism to turn the rear wheels according to corrected rear wheel turning characteristics when it is determined that a failure occurs in the traction control system. The corrected rear wheel turning characteristics are shifted toward the reverse phase side with respect to the original rear wheel turning characteristics.

6 Claims, 6 Drawing Sheets

FOUR-WHEEL-STEERED VEHICLE CONTROL SYSTEM

BACKGROUND OF THE INVENTION

1. Field of the Invention

This invention relates to a control system for a four-wheel-steered vehicle provided with a traction control system.

2. Description of the Prior Art

Recently there has been put into practice a four-wheel-steered vehicle in which both the front and rear wheels are turned when the steering wheel is turned. In such a four-wheel-steered vehicle, the rear wheels are turned according to predetermined rear-wheel turning characteristics which determines the rear wheel turning angle ratio (the ratio of the rear wheel turning angle to the front wheel turning angle). Generally, the rear wheels are turned in the same direction as that of the front wheels when the vehicle speed is relatively high and in a direction opposite to that of the front wheels when the vehicle speed is relatively low. In this specification, that the rear wheels are turned in the same direction as that of the front wheels will be expressed as "the rear wheels are turned in the same phase", and that the rear wheels are turned in a direction opposite to that of the front wheels is expressed as "the rear wheels are turned in the reverse phase". When the rear wheel turning angle ratio is positive, the rear wheels are turned in the same phase and when the rear wheel turning angle ratio is negative, the rear wheels are turned in the reverse phase.

Further, there has been known a traction control system which controls the driving force of the driving wheels when the slip ratio of the driving wheels with respect to the road surface exceeds a preset slip ratio. (See Japanese Unexamined Utility Model Publication No. 60(1985)-60356, for instance.)

Recently there has been proposed a total vehicle control system which controls the four-wheel steering system and the traction control system in combination with each other in order to improve total balance of the vehicle.

Such a total vehicle control system can be better used when it is arranged so that when a failure occurs in one of the control systems, the failure can be compensated for by properly controlling the other control system.

SUMMARY OF THE INVENTION

In view of the foregoing observations and description, the primary object of the present invention is to provide a vehicle control system having both a traction control system and a four-wheel steering system in which, when one of the control systems fails, change in the cornering properties of the vehicle caused due to the failure can be suppressed, thereby preventing the driver from being embarrassed.

In accordance with a first aspect of the present invention, there is provided a vehicle control system for a vehicle which has front and rear wheels, the front wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting the slip ratio of the front wheels with respect to the road surface and a driving force control means which controls the driving force of the front wheels so that the slip ratio of the front wheels converges on a target slip ratio when the slip ratio of the front wheels as detected by the slip ratio detecting means exceeds a preset value, the vehicle control system characterized by having a failure detecting means which detects that a failure occurs in the traction control system, and a rear wheel turning characteristic changing means which controls the four-wheel-steering control means so that it causes the rear wheel turning mechanism to turn the rear wheels according to second rear wheel turning characteristics when the failure detecting means detects that a failure occurs in the traction control system, the second rear wheel turning characteristics being shifted toward the reverse phase side with respect to the first rear wheel turning characteristics.

In accordance with a second aspect of the present invention, there is provided a vehicle control system for a vehicle which has front and rear wheels, the front wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting the slip ratio of the front wheels with respect to the road surface and a driving force control means which controls the driving force of the front wheels so that the slip ratio of the front wheels converges on a target slip ratio when the slip ratio of the front wheels as detected by the slip ratio detecting means exceeds a preset value, the vehicle control system characterized by having a failure detecting means which detects that a failure occurs in the four-wheel steering system, and a target slip ratio changing means which increases the target slip ratio when the failure detecting means detects that a failure occurs in the four-wheel steering system.

In accordance with a third aspect of the present invention, there is provided a vehicle control system for a vehicle which has front and rear wheels, the rear wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting the slip ratio of the rear wheels with respect to the road surface and a driving force control means which controls the driving force of the rear wheels so that the slip ratio of the rear wheels converges on a target slip ratio when the slip ratio of the rear wheels as detected by the slip ratio detecting means exceeds a preset value, the vehicle control system characterized by having a failure detecting means which detects that a failure occurs in the traction control system, and a rear wheel turning characteristic changing means which controls the four-wheel-steering control means so that it causes the rear wheel turning mechanism to turn the rear wheels according to second rear wheel turning characteristics when the failure detecting means detects that a failure occurs in the traction control system, the second rear wheel turning characteristics being shifted toward the same phase side with respect to the first rear wheel turning characteristics.

In accordance with a fourth aspect of the present invention, there is provided a vehicle control system for a vehicle which has front and rear wheels, the rear wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting the slip ratio of the rear wheels with respect to the road surface and a driving force control means which controls the driving force of the rear wheels so that the slip ratio of the rear wheels converges on a target slip ratio when the slip ratio of the rear wheels as detected by the slip ratio detecting means exceeds a preset value, the vehicle control system characterized by having a failure detecting means which detects that a failure occurs in the four-wheel steering system, and a target slip ratio changing means which reduces the target slip ratio when the failure detecting means detects that a failure occurs in the four-wheel steering system.

Though, in the vehicle control systems in accordance with the first and second aspects of the present invention, that the front wheels are the driving wheels is premised, it is not necessary that only the front wheels are the driving wheels but both the front and rear wheels may be the driving wheels so long as a larger driving force is transmitted to the front wheels.

Similarly, though, in the vehicle control systems in accordance with the third and fourth aspects of the present invention, that the rear wheels are the driving wheels is premised, it is not necessary that only the rear wheels are the driving wheels but both the front and rear wheels may be the driving wheels so long as a larger driving force is transmitted to the rear wheels.

That is, in this specification, the expression "the front wheels are driving wheels" or "the rear wheels are driving wheels" should not be interpreted to exclude a so-called four-wheel drive vehicle.

When the traction control system fails in the vehicle where the front wheels are the driving wheels, the front wheels become apt to slip and understeer tendency is enhanced. In the vehicle control system in accordance with the first aspect of the present invention, the rear wheel turning characteristics are shifted toward the reverse phase side to weaken the understeer tendency when the traction control system fails, whereby change in the cornering properties of the vehicle caused due to the failure can be suppressed, and the driver is prevented from being embarrassed.

Generally the four-wheel steering system is arranged so that the rear wheels are held in the neutral position in case a failure occurs in the rear wheel turning system, and the more embarrassed the driver is, the higher the vehicle speed upon failure is. Since the rear wheels are turned in the same phase when the vehicle travels at a high speed, the vehicle exhibits an oversteer tendency when the four-wheel steering system fails and the rear wheels are held in the neutral position in the case of a vehicle the front wheels of which are the driving wheels. In the vehicle control system in accordance with the second aspect of the present invention, the target slip ratio of the traction control system is increased to weaken the oversteer tendency when the four-wheel steering system fails, whereby change in the cornering properties of the vehicle caused due to the failure can be suppressed, and the driver is prevented from being embarrassed.

When the traction control system fails in the vehicle where the rear wheels are the driving wheels, the rear wheels become apt to slip and oversteer tendency is enhanced. In the vehicle control system in accordance with the third aspect of the present invention, the rear wheel turning characteristics are shifted toward the same phase side to weaken the oversteer tendency when the traction control system fails, whereby change in the cornering properties of the vehicle caused due to the failure can be suppressed, and the driver is prevented from being embarrassed.

Generally the four-wheel steering system is arranged so that the rear wheels are held in the neutral position in case a failure occurs in the rear wheel turning system, and the more embarrassed the driver is, the higher the vehicle speed upon failure is. Since the rear wheels are turned in the same phase when the vehicle travels at a high speed, the vehicle exhibits an oversteer tendency when the four-wheel steering system fails and the rear wheels are held in the neutral position in the case of a vehicle the rear wheels of which are the driving wheels. In the vehicle control system in accordance with the second aspect of the present invention, the target slip ratio of the traction control system is reduced to weaken the oversteer tendency when the four-wheel steering system fails, whereby change in the cornering properties of the vehicle caused due to the failure can be suppressed, and the driver is prevented from being embarrassed.

DESCRIPTION OF THE PREFERRED EMBODIMENTS

Figure 1:
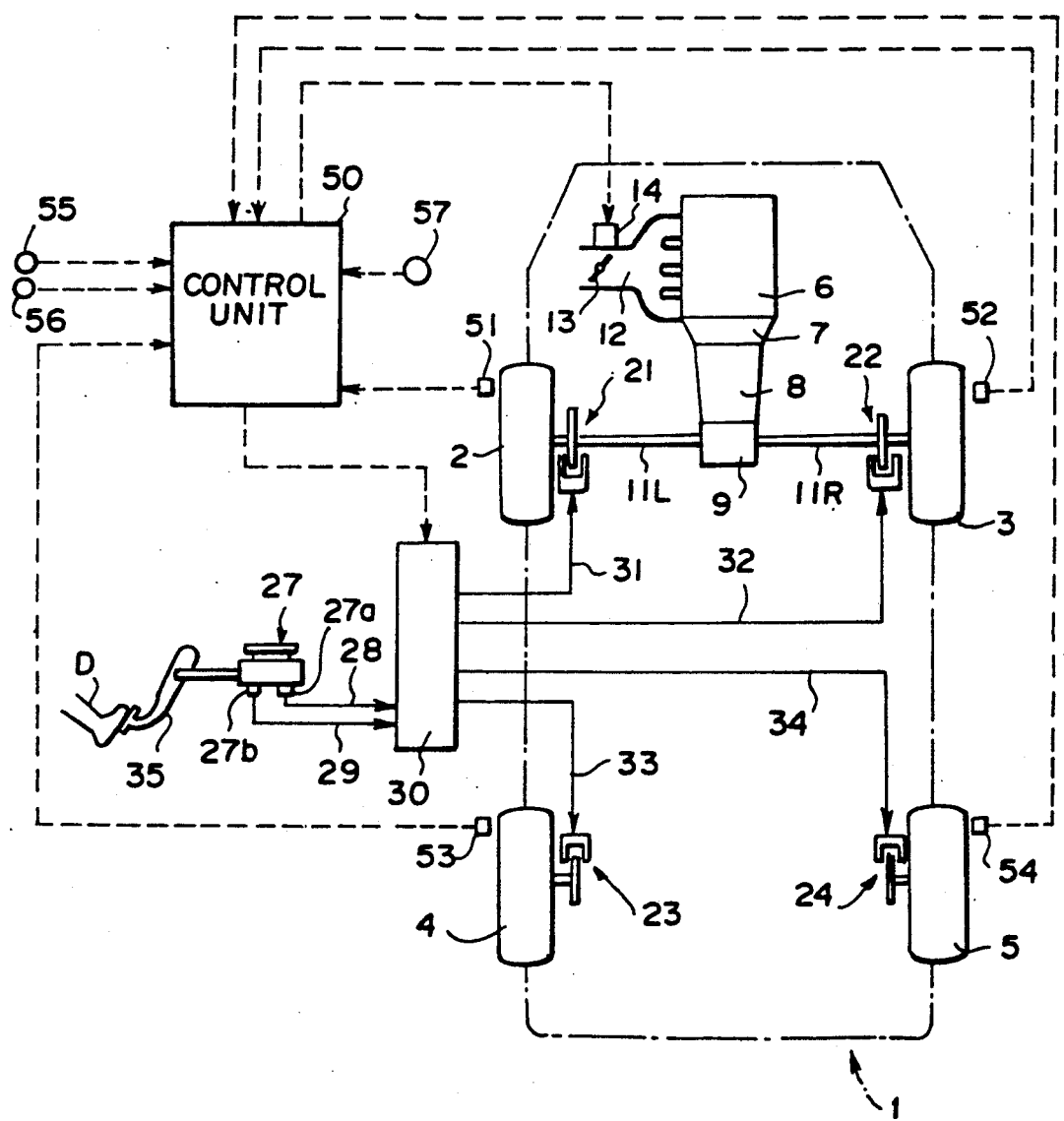
FIGS. 1 and 2 are schematic views showing a four-wheel-steered vehicle provided with a control system in accordance with an embodiment of the present invention, FIG. 1 showing the traction control system and FIG. 2 showing the four-wheel steering system.

In FIG. 1, a front-engine front-drive vehicle 1 has left and right front wheels 2 and 3 and left and right rear wheels 4 and 5. Reference numeral 6 denotes an engine the output torque of which is transmitted to the front wheels 2 and 3 by way of a clutch 7, a transmission 8, differential 9 and left and right drive shafts 11L and 11R.

The engine 6 is a gasoline engine and is provided with a throttle valve 13 in an intake passage 12. The throttle valve 13 is closed and opened electromagnetically by a throttle actuator 14. As the throttle actuator 14, a DC motor, a stepping motor or an actuator which is hydraulically driven and controlled an electromagnetic means may be used.

The wheels 2 to 5 are respectively provided with disk brakes 21 to 24 each of which is of the well-known structure and is driven by brake fluid pressure fed to a wheel cylinder (not shown). A tandem master cylinder 27 having a pair of discharge ports 27a and 27b produces the brake fluid pressure. A pair of brake lines 28 and 29 extending from the respective discharge ports 27a and 27b are connected to a brake fluid pressure control unit 30. The brakes 21 to 24 are separately connected to the brake fluid pressure control unit 30 by four lines 31 to 34. The master cylinder 27 produces brake fluid pressure according to the amount of depression of a brake pedal 35 by a driver D.

The brake fluid pressure control unit 30 comprises an oil pump, electro-magnetic valves and can separately control the brake fluid pressures applied to the respective brakes 21 to 24. Such a structure of the brake fluid pressure control unit 30 has been used in the conventional traction control systems and is well known, and accordingly, will not be described in detail here.

Figure 2:
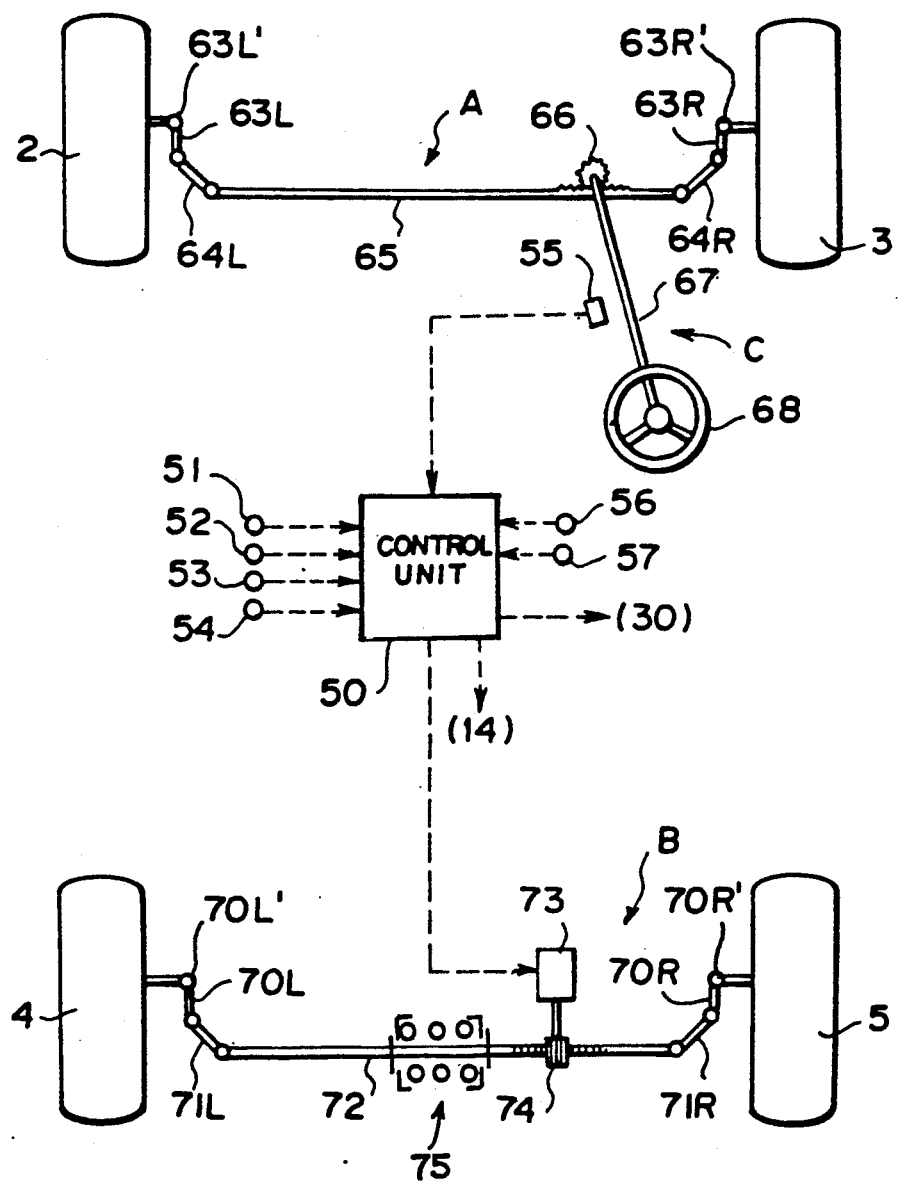

The vehicle 1 is a four-wheel-steered vehicle and has a front wheel turning mechanism A, a rear wheel turning mechanism B and a steering system C as shown in FIG. 2. The front wheel turning mechanism A comprises a left and right knuckle arms 63L and 63R, a left and right tie rods 64L and 64R and a front wheel turning rod 65 which connects the tie rods 64L and 64R. The steering mechanism C comprises a steering wheel 68 and a steering shaft 67 and is connected to the front wheel turning mechanism A by way of a rack-and-pinion mechanism 66.

The rear wheel turning mechanism B comprises a left and right knuckle arms 70L and 70R, a left and right tie rods 71L and 71R and a rear wheel turning rod 72 which connects the tie rods 71L and 71R. An electric motor 73 is connected to the rear wheel turning rod 72 by way of a rack-and-pinion mechanism 74. When the electric motor 73 is energized, the rear wheels 4 and 5 are turned left or right according to the direction of rotation of the motor 73. The rear wheel turning rod 72 is spring-urged toward the neutral position where the turning angle of the rear wheels 4 and 5 is 0 by a neutralizing means 75.

Reference numeral 50 in FIG. 1 denotes a control unit which comprises a microcomputer and controls the rear wheel and the driving force in combination. Signals from wheel speed sensors 51 to 54 which detect the rotational speeds of the wheels 2 to 5, a front wheel turning angle sensor 55 which detects the turning angle of the front wheels 2 and 3 by way of the turning angle of the steering wheel 68, a vehicle speed sensor 56 and an accelerator position sensor 57 which detects the amount of depression of the accelerator pedal (not shown) are input into the control unit 50. The control unit 50 is of a well-known structure and comprises a CPU, a ROM, a RAM, a CLOCK, an input/output interface, an A/D convertor, a D/A convertor and the like as needed. Maps and the like which will be described later are stored in the ROM.

Normally the control unit 50 determines a target throttle opening on the basis of the amount of depression as detected by the accelerator position sensor 57 according to basic throttle opening characteristics which has been prepared and stored in the control unit 50, and controls the actuator 14 so that the actual throttle opening converges on the target throttle opening.

The traction control by the control unit 50 will be described, hereinbelow.

In the traction control, the slip ratio S of the driving wheels (front wheels 2 and 3 in this particular embodiment) is calculated according to the following formula.

$$S = (WD - WL)/WD \quad (1)$$

wherein WD represents the rotational speeds of the front or driving wheels 2 and 3 and WL represents the rotational speed of the rear or driven wheels 4 and 5 (the vehicle speed). As the rotational speed of the driven wheels, an average of the rotational speeds of the rear wheels 4 and 5 is employed. As can be understood from formula (1), as the slip ratio S increases, slip of the driving wheels with respect to the road surface increases.

When the slip ratio S exceeds a preset slip ratio (e.g., 0.2), the control unit 50 begins the traction control and reduces the torque to be transmitted to the front wheels 2 and 3. The control unit 50 reduces the torque by reducing the engine output torque by reducing the throttle opening (not according to the basic throttle opening characteristics) and by applying brakes 21 to 24. The reduction of the torque is effected so that the slip ratio S converges on a target slip ratio So(e.g., 0.06). When the slip ratio S is relatively large (e.g., not less than 0.09), the control unit 50 reduces the torque both by reduction of the engine output torque and by application of the brakes. When the slip ratio S is less than 0.09, the control unit 50 reduces the torque solely by reduction of the engine output torque. During the traction control, the throttle opening and the brake fluid pressure are feedback-controlled so that the slip ratio S converges on the target slip ratio So.

The traction control is interrupted, for instance, when the accelerator pedal is released, when the vehicle speed falls below a predetermined value, and when the throttle opening determined according to the basic throttle opening characteristics becomes smaller than that determined by the traction control.

The rear wheel turning control by the control unit 50 will be described, hereinbelow.

Figure 3:
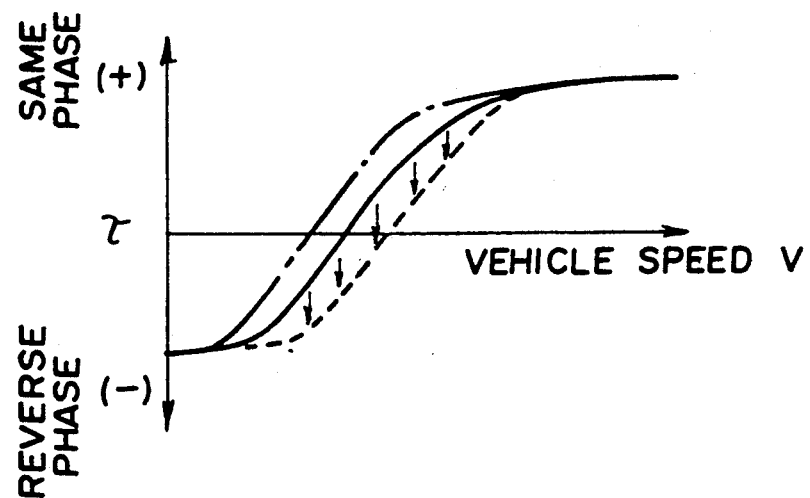
FIG. 3 is a view showing the rear wheel turning characteristics employed in the embodiment.

The control unit 50 causes the rear wheel turning mechanism B to turn the rear wheels 4 and 5 according to the rear wheel turning characteristics shown by the solid line in FIG. 3. In the rear wheel turning characteristics, the rear wheel turning angle ratio $\tau$ ($=\theta R/\theta F$ wherein $\theta R$ and $\theta F$ respectively represent the rear wheel turning angle and the front wheel turning angle) for a given vehicle speed V is given as a function of the vehicle speed V and the front wheel turning angle $\theta F$. A target rear wheel turning angle is obtained by multiplying the rear wheel turning angle ratio $\tau$ by the front wheel turning angle $\theta F$. The control unit 50 outputs a control signal according to the target rear wheel turning angle thus obtained to the motor 73, thereby turning the rear wheels 4 and 5. Though not shown, a rear wheel turning angle sensor is provided, and the motor 73 is feedback-controlled so that the rear wheel turning angle converges on the target rear wheel turning angle.

Figure 4:
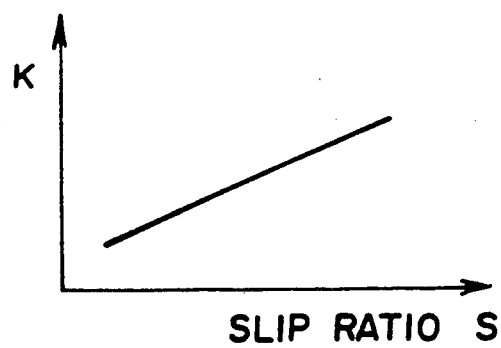
FIG. 4 is a view showing the relation between the correction value and the slip ratio.

Further, when a failure occurs in the four-wheel steering system, the control unit 50 increases the target slip ratio So to a corrected target slip ratio So' (e.g., 0.08). On the other hand, when a failure occurs in the traction control system, the control unit 50 corrects the rear wheel turning characteristics toward the reverse phase side as shown by the broken line in FIG. 3, i.e., so that the rear wheel turning angle ratio $\theta R$ for a given vehicle speed V is smaller than according to the basic rear wheel turning characteristics shown by the solid line in FIG. 3. This correction is effected on the basis of a correction value K which is increased with increase in the slip ratio S as shown in FIG. 4. That is, the rear wheel turning characteristics is shifted toward the reverse phase side by the value of K. The correction value K is changed also according to the vehicle speed V.

The control which executed by the control unit 50 will be described in detail with reference to the flow charts shown in FIGS. 5 to 7, hereinbelow.

Figure 5:
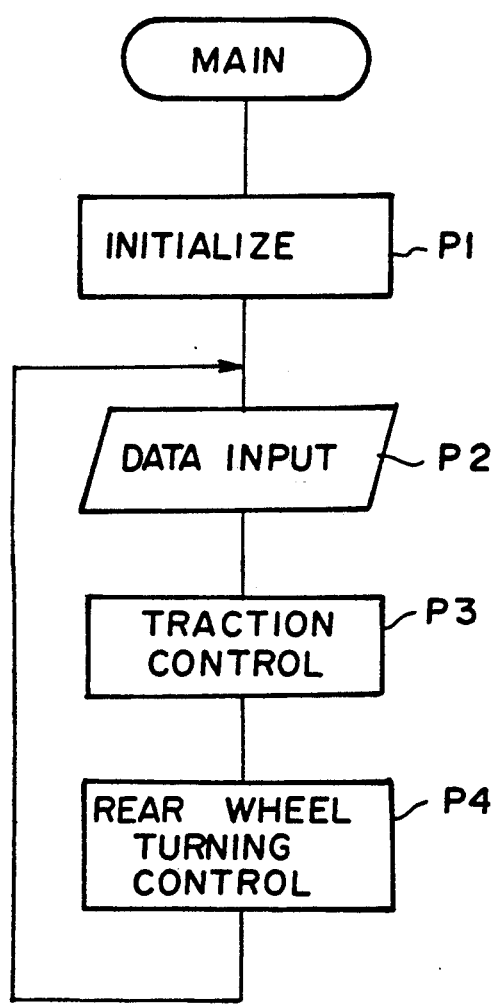
FIGS. 5, 6 and 7 are flow charts for illustrating the operation of the control unit.

In FIG. 5, the system is initialized in step P1, and the control unit 50 reads signals from the sensors 51 to 57 in step P2. Then the control unit 50 begins the traction control in step P3, and then begins the rear wheel turning control in step P4.

Figure 6:
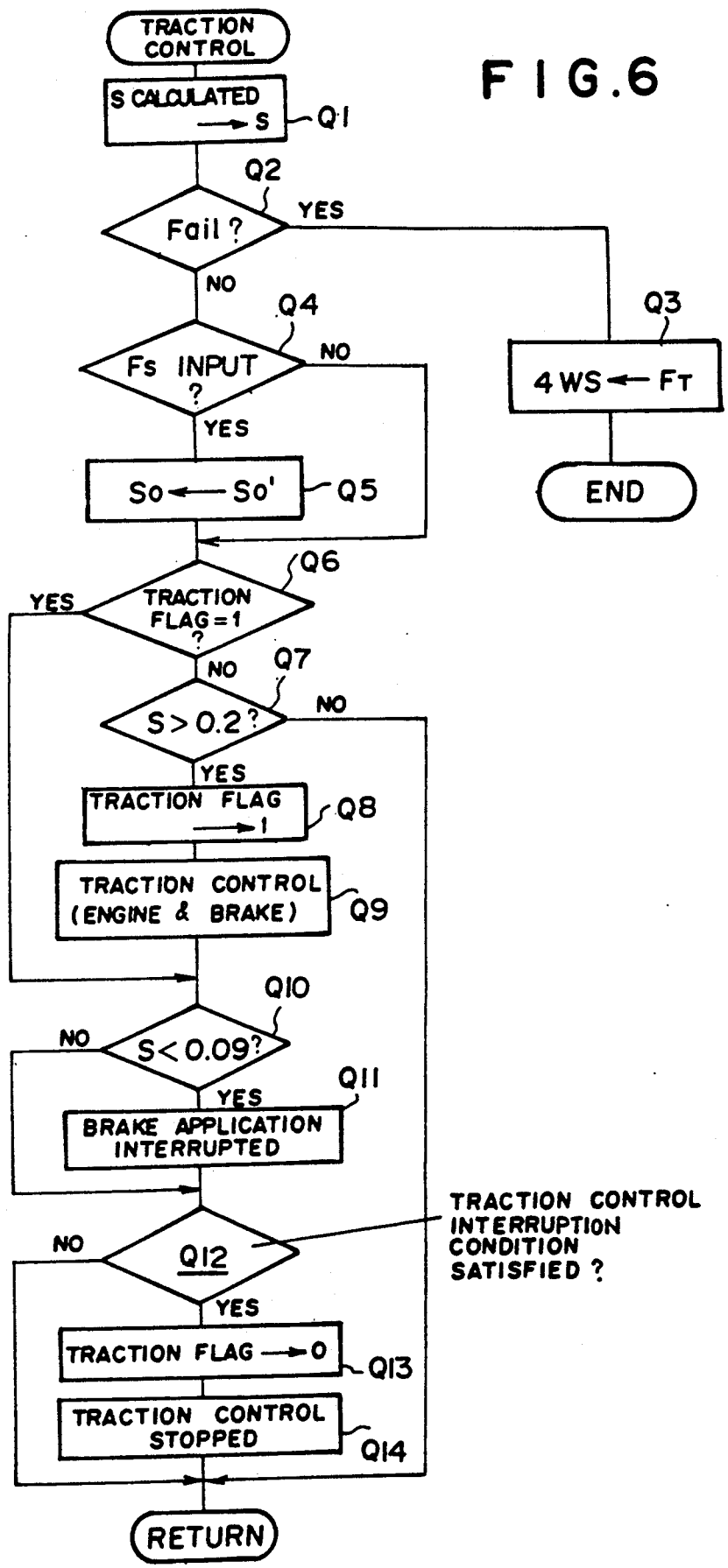

The traction control in step P3 is executed in the manner shown in FIG. 6.

In step Q1, the control unit 50 calculates the slip ratio S of the driving wheels according to the formula (1) described above. Then in step Q2, the control unit 50 determines whether the traction control system has failed. When it is determined that the traction control system has failed, the control unit 50 outputs a traction control failure signal $F_T$ and interrupts the traction control. (step Q3) On the other hand, when it is determined in step Q2 that the traction control system has not failed, the control unit 50 determines in step Q4 whether a rear wheel turning control failure signal $F_S$ which represents that the four-wheel steering system has failed has been input. When it is determined that the rear wheel turning control failure signal $F_S$ has been input, the control unit 50 proceeds to step Q6 after increasing the target slip ratio So to the corrected target slip ratio So' in step Q5. Otherwise the control unit 50 directly proceeds to step Q6.

Then the control unit 50 determines in step Q6 whether a traction flag is 1. That the traction flag is 1 means that the traction control is being effected. When it is determined in step Q4 that the traction flag is not 1, the control unit 50 determines in step Q7 whether the slip ratio S is larger than the preset slip ratio 0.2. When it is determined that the slip ratio S is larger than the preset slip ratio 0.2, the control unit 50 begins the traction control by reduction of the engine output torque and application of the brakes 21 to 24 after setting the traction flag to 1 in step Q8. (step Q9)

Then the control unit 50 proceeds to step Q10 and determines whether the slip ratio S is smaller than 0.09. When it is determined in step Q6 that the traction flag is 1, the control unit 50 directly proceeds to step Q10 from step Q6. When it is determined in step Q10 that the slip ratio S is smaller than 0.09, the control unit 50 interrupts the traction control by application of the brakes in step Q11 and proceeds to step Q12. When it is determined in step Q10 that the slip ratio S is not smaller than 0.09, the control unit 50 directly proceeds to step Q12 (continues the traction control by application of the brakes).

In step Q12, the control unit 50 determines whether the condition for interrupting the traction control has been satisfied. When it is determined that the condition for interrupting the traction control has been satisfied, the control unit 50 stops the traction control after resetting the traction flag to 0 in step Q13 (step Q14)

Figure 7:
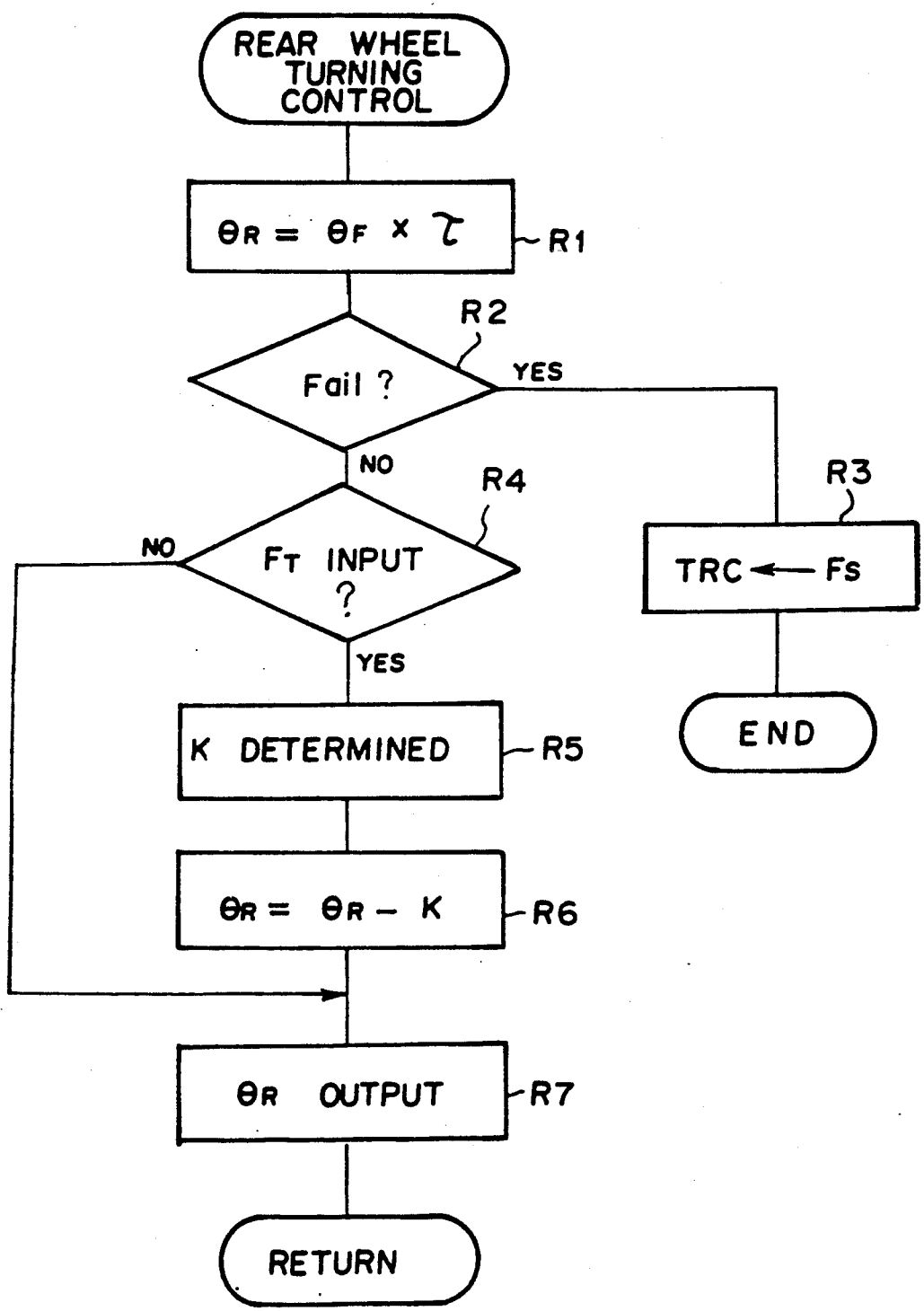

The rear wheel turning control in step P4 is executed in the manner shown in FIG. 7.

The control unit 50 first calculates a target rear wheel turning angle $\theta R$ by multiplying the front wheel turning angle $\theta F$ by the rear wheel turning angle ratio $\tau$ determined on the basis of the vehicle speed V according to the rear wheel turning characteristics shown by the solid line in FIG. 3. (step R1) Then in step R2, the control unit 50 determines whether the four-wheel steering system has failed. When it is determined that the four-wheel steering system has failed, the control unit 50 outputs the rear wheel turning control failure signal $F_S$ and interrupts the rear wheel turning control. (step R3) On the other hand, when it is determined in step R2 that the four-wheel steering system has not failed, the control unit 50 determines in step R4 whether the traction control failure signal $F_T$ has been input. When it is determined in step R4 that the traction control failure signal $F_T$ has not been input, the control unit 50 directly proceeds to step R7 and outputs the target rear wheel turning angle $\theta R$ as calculated in step R1. On the other hand, when it is determined in step R4 that the traction control failure signal $F_T$ has been input, the control unit 50 determines the correction value K on the basis of the slip ratio S according to the map shown in FIG. 4, and subtracts the correction value K thus determined from the target rear wheel turning angle $\theta R$ calculated in step R1, and outputs the value of the target rear wheel turning angle $\theta R$ thus obtained as the target rear wheel turning angle $\theta R$. (steps R5, R6 and R7)

In this embodiment, the driving wheels are the front wheels 2 and 3. When the traction control system fails in the vehicle where the front wheels are the driving wheels, the front wheels become apt to slip and understeer tendency is enhanced. In this embodiment, the control unit 50 shifts the rear wheel turning characteristics toward the reverse phase side when the traction control system fails and accordingly the understeer tendency is weakened, whereby change in the cornering properties of the vehicle caused due to the failure can be suppressed, and the driver is prevented from being embarrassed.

The correction value K also changes with the vehicle speed V. When the target rear wheel turning angle $\theta R$ is corrected with the correction value K in the manner described above, the rear wheel turning characteristics becomes as shown by the broken line in FIG. 3.

Generally the four-wheel steering system is arranged so that the rear wheels are held in the neutral position by the neutralizing means 75 in case a failure occurs in the rear wheel turning system, and the more embarrassed the driver is, the higher the vehicle speed embarrassed the driver is, the higher the vehicle speed upon failure is. Since the rear wheels are turned in the same phase when the vehicle travels at a high speed, the vehicle exhibits an oversteer tendency when the four-wheel steering system fails and the rear wheels are held in the neutral position in the case of a vehicle the front wheels of which are the driving wheels. In the vehicle control system in accordance with this embodiment, the target slip ratio So of the traction control system is increased to weaken the oversteer tendency when the four-wheel steering system fails, whereby change in the cornering properties of the vehicle caused due to the failure can be suppressed, and the driver is prevented from being embarrassed.

When the traction control system fails in the vehicle where the rear wheels 4 and 5 are the driving wheels unlike in the embodiment described above, the rear wheels become apt to slip and oversteer tendency is enhanced. By shifting the rear wheel turning characteristics toward the same phase side as shown by the chained line in FIG. 3, the oversteer tendency can be weakened, whereby change in the cornering properties of the vehicle caused due to the failure can be suppressed, and the driver is prevented from being embarrassed.

Further when the four-wheel steering system fails in the vehicle where the rear wheels 4 and 5 are the driving wheels, by reducing the target slip ratio So of the traction control system (e.g., from 0.06 to 0.04), the oversteer tendency can be weakened, whereby change in the cornering properties of the vehicle caused due to the failure can be suppressed, and the driver is prevented from being embarrassed.

We claim:

1. A vehicle control system for a vehicle which has front and rear wheels, the front wheels being driving wheels, and is provided with a four-wheel steering system comprising a front wheel turning mechanism which turns the front wheels in response to turning a steering wheel, a rear wheel turning mechanism which turns the rear wheels and a four-wheel steering control means which causes the rear wheel turning mechanism to turn the rear wheels according to first predetermined rear wheel turning characteristics, and a traction control system comprising a slip ratio detecting means for detecting a slip ratio of the front wheels with respect to the road surface where the slip ratio is a function of the relative rotational speeds of the front and rear wheels and a driving force control means which controls the driving force of the front wheels so that the slip ratio of the front wheels converges on a target slip ratio when the slip ratio of the front wheels as detected by the slip ratio detecting means exceeds a preset value where the target slip ratio represents a value that the slip ratio should be converted to after the slip ratio exceed said preset value where the preset value is greater than the target value of the slip ratio, the vehicle control system characterized by having a failure detecting means which detects that a failure occurs in the traction control system, and a rear wheel turning characteristic changing means which controls the four-wheel-steering control means to cause the rear wheel turning mechanism to turn the rear wheels according to second rear wheel turning characteristics when the failure detecting means detects that a failure occurs in the traction control system, the second rear wheel turning characteristics being shifted toward a reverse phase side with respect to the first rear wheel turning characteristics where the reverse phase side occurs when the rear wheels are turned in the direction opposite to that of the front wheels.

2. A vehicle control system as defined in claim 1 further comprising another failure detecting means which detects that a failure occurs in the four-wheel steering system, and a target slip ratio changing means which increases the target slip ratio when said another failure detecting means detects that a failure occurs in the four-wheel steering system.

3. A vehicle control system for a vehicle which has front and rear wheels, the front wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting a slip ratio of the front wheels with respect to the road surface where the slip ratio is a function of the relative rotational speeds of the front and rear wheels and a driving force control means which controls the driving force of the front wheels so that the slip ratio of the front wheels converges on a target slip ratio when the slip ratio of the front wheels as detected by the slip ratio detecting means exceeds a preset value where the target slip ratio represents a value that the slip ratio should be converted to after the slip ratio exceeds said preset value where the preset value is greater than the target value of the slip ratio, the vehicle control system characterized by having a failure detecting means which detects that a failure occurs in the four-wheel steering system, and a target slip ratio changing means which increases the target slip ratio when the failure detecting means detects that a failure occurs in the four-wheel steering system.

4. A vehicle control system for a vehicle which has front and rear wheels, the rear wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting a slip ratio of the rear wheels with respect to the road surface where the slip ratio is a function of the relative rotational speeds of the front and rear wheels and a driving force control means which controls the driving force of the drear wheels so that the slip ratio of the rear wheels converges on a target slip ratio when the slip ratio of the rear wheels as detected by the slip ratio detecting means exceeds a preset value where the target slip ratio represents a value that the slip ratio should be converted to after the slip ratio exceeds said preset value where the preset value is greater than the target value of the slip ratio, the vehicle control system characterized by having a failure detecting means which detects that a failure occurs in the traction control system, and a rear wheel turning characteristic changing means which controls the four-wheel-steering control means to cause the rear wheel turning mechanism to turn the rear wheels according to second rear wheel turning characteristics when the failure detecting means detects that a failure occurs in the traction control system, the second rear wheel turning characteristics being shifted toward a same phase side with respect to the first rear wheel turning characteristics where the same phase side occurs when the rear wheels are turned in the same direction as that of the front wheels.

5. A vehicle control system as defined in claim 4 further comprising
   another failure detecting means which detects that a failure occurs in the four-wheel steering system, and
   a target slip ratio changing means which reduces the target slip ratio when said another failure detecting means detects that a failure occurs in the four-wheel steering system.

6. A vehicle control system for a vehicle which has front and rear wheels, the rear wheels being driving wheels, and is provided with a four-wheel steering system comprising a front wheel turning mechanism which turns the front wheels in response to turning a steering wheel, a rear wheel turning mechanism which turns the rear wheels and a four-wheel-steering control means which causes the rear wheel turning mechanism to turn the rear wheels according to first predetermined rear wheel turning characteristics, and a traction control system comprising a slip ratio detecting means for detecting a slip ratio of the rear wheels with respect to the road surface where the slip ratio is a function of the relative rotational speeds of the front and rear wheels and a driving force control means which controls the driving force of the rear wheels so that the slip ratio of the rear wheels converges on a target slip ratio when the slip ratio of the rear wheels as detected by the slip ratio detecting means exceeds a preset value where the target slip ratio represents a value that the slip ratio should be converted to after the slip ratio exceeds said preset value where the preset value is greater than the target value of the slip ratio, the vehicle control system characterized by having
   a failure detecting means which detects that a failure occurs in the four-wheel steering system, and
   a target slip ratio changing means which reduces the target slip ratio when the failure detecting means detects that a failure occurs in the four-wheel steering system.

* * * * *